United States Patent Office 2,948,649
Patented Aug. 9, 1960

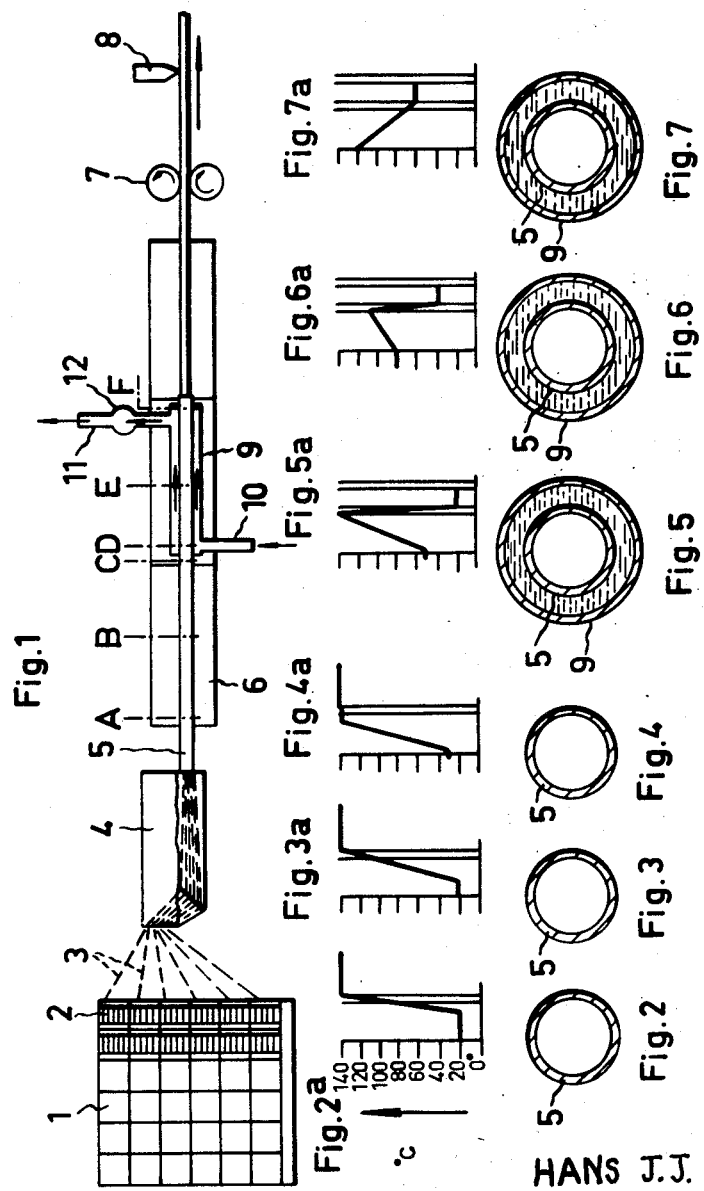

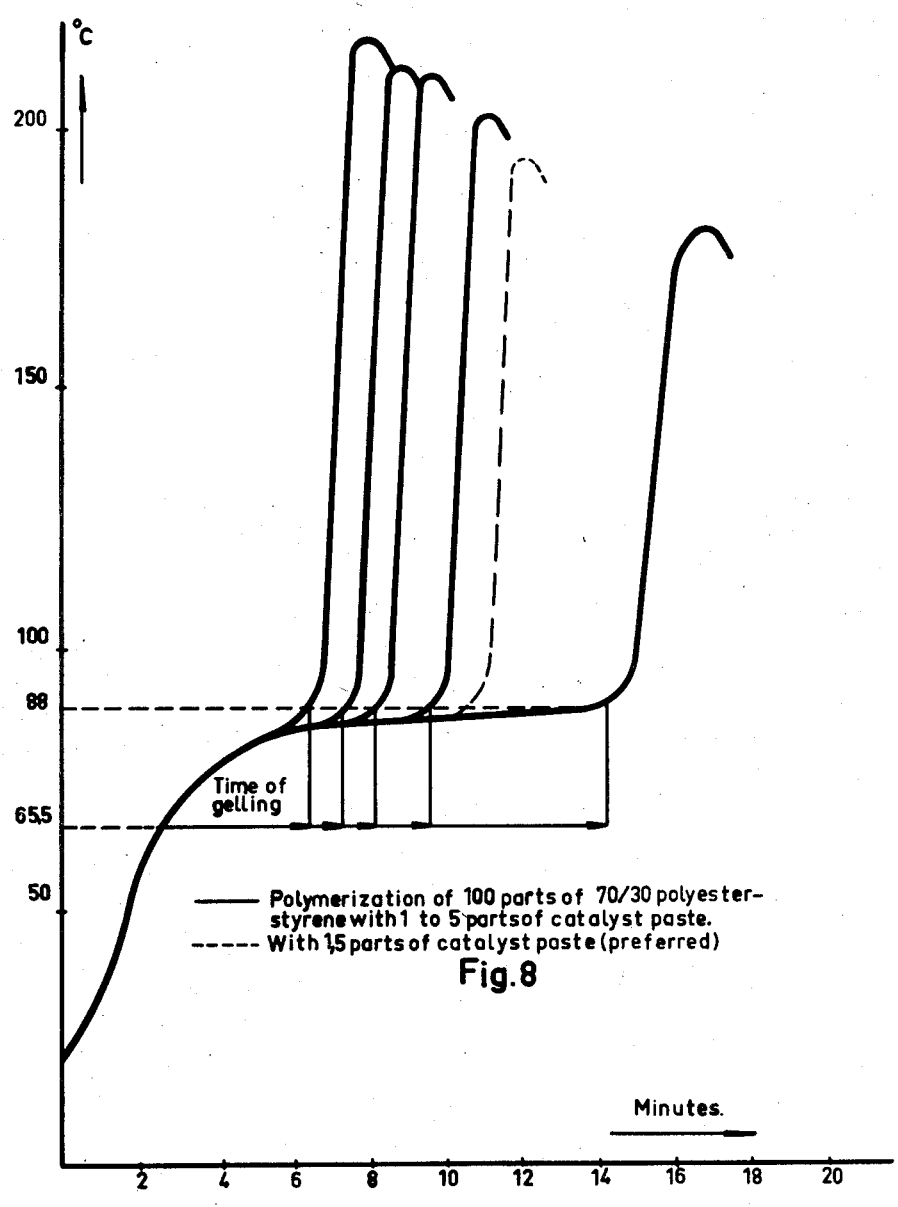

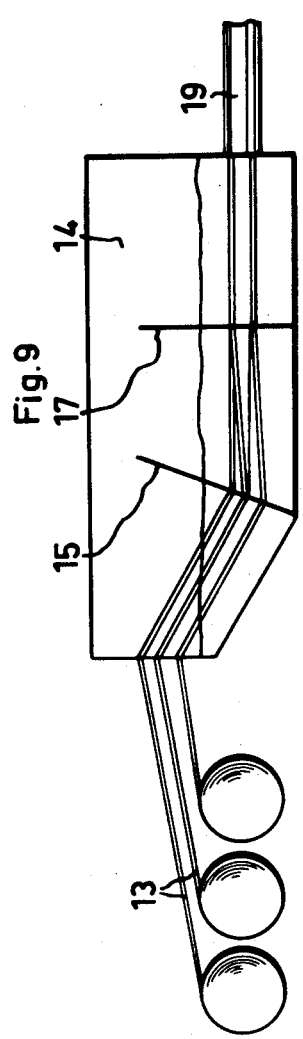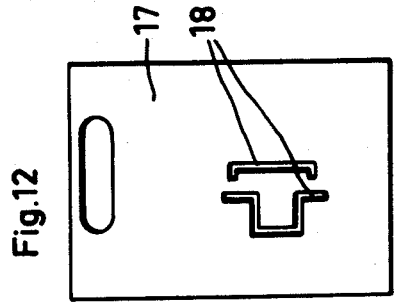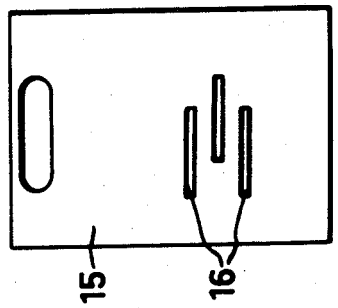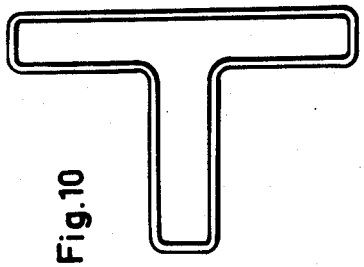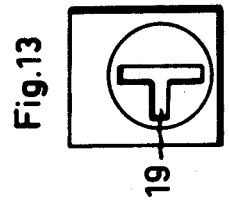

2,948,649

METHOD OF MANUFACTURING SECTIONS AND RODS OF GLASS FIBRE-REINFORCED PLASTIC

Hans Johannes Joachim Pancherz, Erikslustvagen 38B, Malmo, Sweden

Filed Dec. 12, 1957, Ser. No. 702,350

Claims priority, application Sweden Dec. 14, 1956

6 Claims. (Cl. 154—91)

In a prior art method for manufacturing rods and sections of glass fibre-reinforced plastic which is performed in a continuous or regularly progressive run as distinguished from still older intermittent methods, glass fibres in the form of filaments are unwound from delivery spools and continuously moved through a bath of a liquid plastic passing at a temperature increase into a hardened state and mouldable at low pressure (low pressure-low temperature thermosetting plastic), in which bath said glass fibres are impregnated, whereupon the impregnated fibres are drawn with the plastic adhering thereto directly from the bath of plastic into a moulding tube of the desired cross-sectional configuration and moved forward within the tube while completely filling it, the heat being applied externally of the tube, and a continuous strand consisting of the glass fibres and the hardened plastic being drawn out of the tube and finally cut into desired lengths. The continuous or regularly progressive manufacture has been made possible by adhering to certain rules which consist in so adapting the heating of the plastic moved forward within the tube that the course of polymerization in the plastic is only initiated while it still is in said tube but is completed, in hardening the plastic, by a further heating after the strand of glass fibres and plastic has emerged from the tube. The moulding tube serves to hold the plastic-impregnated glass fibres together until the polymerization has proceeded so far that the plastic is about to pass into the gel state. By a control of the temperature and of the speed of the continuous forward motion of the glass fibres, the point at which the plastic passes from the liquid state into the gel state is positioned immediately ahead of the outlet opening of the moulding tube so that the plastic will pass from the gel state into the hardened state a few centimeters beyond said point. It is absolutely necessary to adhere exactly to this positioning, for as soon as the gelling point moves into the moulding tube the plastic will adhere to the wall thereof and bring about a throttling of the bore, leading to a stoppage of the moulding machine and destruction of the moulding tube.

The rods or sections obtained by this method present a raw surface, which is insignificant in certain cases, for instance when the rods are used as blanks for the manufacture of fishing rods for spinning or motor-car radio antennas, as the blanks have nevertheless to be ground to conically tapering shape, but is disadvantageous in other cases because it involves the necessity of resorting to a surface treatment which is otherwise unnecessary. Furthermore, the rods are characterized by an extraordinarily high tensile strength and bending strength but on the other hand by a very low strength in the transverse direction since the glass fibre reinforcement of the rods consists of fibres or filaments all of which extend longitudinally of the rods.

The method described above permits the successive manufacture of rods and sections up to a cross-sectional area of 200 sq. mm. or of sections up to a largest wall thickness of 6 mm. As soon as larger dimensions are to be manufactured a further disadvantage of this method appears. As the heat is supplied from the outside to the plastic moving at constant speed through the moulding tube and as thermosetting plastics generally are poor heat conductors, the plastic takes up the supplied heat at its surfaces of contact with the moulding tube but conducts the heat only very slowly toward the center axis of the tube. As a result, one has to work with considerably higher temperatures than otherwise necessary in order to reach, in the center of the cross section of the tube, the temperature necessary for hardening the plastic. At the manufacture of coarse rods one obtains for instance a hardening of the outer shell of 5 mm. thickness whereas the core is soft. By the development of exothermic heat in the plastic at the hardening of the outer layer there arises an accumulation of heat in the interior of the core, bringing about a hardening of said core also, which gives rise to a further development of exothermic heat and consequently of unpermissibly high temperatures in the core. As a matter of fact, temperatures are reached in the core which lie above the boiling point of the monomeric styrene contained in the plastic. The boiling leads to formation of cracks in the products and thus to such a deterioration of the appearance and strength that the products must be considered as waste.

In spite of the progress which the method in question has implied, it has not proved satisfactory by reason of the above deficiences for manufacturing rods and sections for many uses for which they could be suitable in and per se. To make it possible to use rods or sections of glass fibre-reinforced plastic in the construction of buildings and the furniture industry it is thus necessary in view of price—formation-plastic materials being very expensive—not only to have a manufacturing method which is continuous in the proper sense but also to dispose of a material which on leaving the moulding machine is ready for immediate use without any after-treatment, and possibly also pigmented. Besides, sections for use in building structures and furniture must have considerably larger cross-sectional areas than those obtainable with the use of the prior art method. For some purposes there is not required any particularly high tensile strength or bending strength of the rods or sections but instead an increase of the strength in the transverse direction as compared with sections having a reinforcement only in the longitudinal direction.

This invention relates to an improved method which overcomes the above mentioned difficulties, thus considerably widening the range of use of rod and section materials of glass fibre-reinforced plastic.

The characteristic novel features of the method in which the glass fibres may have the shape of filaments and/or woven or interwoven bands, are that during the first part of its travel through the moulding tube the glass-fibre and plastic material is heated up to a point where the plastic is on the borderline of passing from a readily flowing state into the gel state, and is then cooled during the remaining part of its travel through the tube in order to interrupt the course of gelling and hardening of the plastic in an outer layer adjacent the peripheral surface thereof but to permit it to proceed to a hardening closer to the center axis of the tube, and that the strand emerging from the tube is again heated to harden also said outer layer and to finish the hardening of the plastic throughout the entire cross section of the strand.

Further features of the invention and the advantages gained thereby will become apparent from the following description, reference being had to the accompanying drawings in which:

Fig. 1 is a diagrammatic side elevation of a plant for manufacturing rods according to the abovementioned continuous method completed with a device for carrying out said method in the improved version according to the invention.

Figs. 2–7 are cross sections of the moulding tube of the plant and of the glass-fibre and plastic material therein, taken at points A–F in Fig. 1.

Figs. 2a–7a are temperature diagrams for the respective cross sections.

Fig. 8 is a graph elucidating the relation of heating time and temperature for polyester plastic during the polymerization thereof.

Fig. 9 is a view of part of a similar plant adapted for the manufacture of sections having a reinforcement of glass-fibre fabric.

Fig. 10 is a cross section showing by way of example, the design of a T-section having such a reinforcement.

Figs. 11 and 12 are views showing two plates having guiding and moulding slots for the woven glass fibre bands which are to form the reinforcement of the T-section according to Fig. 10.

Fig. 13 is a view showing the cross-sectional configuration of the moulding tube.

From a stand 1 carrying a great number of glass fibre filament delivery spools 2 glass filaments 3 are drawn into a container 4 for liquid plastic, for instance polyester plastic, with which the glass filaments are impregnated and then assembled to a strand which together with the plastic adhering thereto is drawn into a moulding tube 5 of for instance steel, which is directly connected to the container 4. Except for a short distance adjacent the container 4 the moulding tube 5 is enclosed by a heating chamber 6. Said chamber is divided into three sections, the tube 5 being located in the two first sections and ending at the beginning of the third section in which the strand of glass fibres and plastic emerging from the tube is heated for completing the hardening of the plastic. The continuous movement of the glass fibres and the plastic adhering thereto and of the shaped and hardened strand, respectively, is brought about by a draw mechanism 7, and the finished strand is cut into desired lengths by means of a cutting mechanism 8.

According to the present invention, instead of electrical heating elements or other means for supplying external heat, there is provided in the intermediate one of the three sections of the heating chamber 6 a cooling jacket 9 about the moulding tube 5. Said cooling jacket 9 has connection sockets 10 and 11 at the rear and front end, respectively, for the supply and discharge, respectively, of a suitable coolant such as water or oil which consequently flows in said jacket in the direction of motion of the glass-fibre and plastic material. Inserted in the connection socket 11 is a thermostatically controlled regulator 12 for the amount of coolant flowing through said jacket. This permits controlling said amount in dependence on the temperature at the outlet. As, in addition, the heating in the first section of the heating chamber 6 can be controlled by means of a thermostat, for instance by a thermostatically controlled connection and disconnection of electrical heating elements, and the travelling speed of the material through the plant can be controlled by the draw mechanism 7 being driven via an infinitely variable gear, there exist several possibilities of adapting the effect of the heating and cooling on the course of hardening in the plastic as the latter moves through the tube 5. Arranged in the third section of the heating chamber 6 are means, likewise thermostatically controlled, such as electrical elements, for supplying heat externally to the glass-fibre and plastic strand to conclude in this section the hardening of the plastic, which was initiated in the first two sections, that is to effect an after-hardening.

To understand how the hardening of the plastic proceeds during and after the travel thereof through the moulding tube 5 under the influence of the externally effected heating and cooling, one must know the principal polymerization characteristics of low pressure-low temperature thermosetting plastics. These characteristics are elucidated as to polyester plastic by the graph in Fig. 8 which shows the temperature of the plastic as a function of the heating time at a temperature of the surrounding heating medium (for instance hot water bath or hot air) of 82° C. and with differently large amounts of addition of catalyst paste. During that part of the heating time which is required for heating the plastic from 65.5° C. to 88° C. the plastic passes from the liquid state into the gel state. At the continued heating a sudden increase of the temperature takes place, said increase occurring the earlier, the larger the added amount of catalyst paste is. The dashed curve corresponds to an amount of 1.5 parts of catalyst paste to 100 parts of plastic. This temperature increase is due to an exothermic heat development in the plastic as the latter polymerizes and abruptly passes from the gel state into the hardened state.

In the first section of the heating chamber 6 the plastic is successively heated from room temperature, about 20° C., to the temperature of the heating chamber, e.g. 140°, as will appear from Figs. 2a, 3a and 4a which relate to the sections in Figs. 2, 3 and 4, respectively. So much heat is supplied that when the plastic enters the second section (cooling section) the outer peripheral surface of the plastic which is in contact with the moulding tube 5 is just on the borderline of passing into the gel state. As at this moment the plastic enters the cooling section where the coolant may have a temperature at the inlet of about 15° C., and is rapidly cooled on its peripheral surface, as is elucidated in Figs. 5 and 5a, the course of polymerization in the outer layer is interrupted. Part of the heat hitherto taken up by the plastic is conducted farther into the plastic core and there causes a temperature increase which is the more rapid the closer it gets to the center axis. Another part of the taken-up heat is led away from the outer layer by the coolant which thereby obtains a higher temperature itself as it flows in the direction of motion of the plastic. A temperature decrease thus arises at the periphery of the plastic material whereas a temperature increase is obtained at its center axis, which is elucidated in Figs. 6 and 6a. At the end of the cooling section the temperature in the center of the material has already risen so far that the gelling point is reached and the hardening and the associated exothermic heat development has started. This is shown in Figs. 7 and 7a. A suitable adaptation of the heating temperatures in the first section, the amount of flow of the coolant and the drawing speed will cause the product to leave the moulding tube 5 at the entrance to the third section in an already hardened state, and the product only has an extremely thin outer layer in still liquid condition. One thus avoids an over-heating in any portion of the material strand. In the third section of the heating chamber 6 heat is again supplied at a temperature of say 110° C., the core of the material strand being after-hardened and also the outer layer being hardened. As the latter is not any more surrounded by the moulding tube the plastic assumes and in hardening retains a completely smooth surface. Thanks to the interior of the strand being partially hardened already when the strand is extracted from the tube 5, the strand is self-supporting outside said tube so that sagging is avoided.

In the foregoing the invention has been described in connection with the manufacture of rods. However, it is also suited for other sections including such as contain a reinforcement of woven glass fibre bands instead of merely longitudinally extending parallel glass-fibre filaments. The manufacture of a T-section having such a reinforcement is diagrammatically shown in Figs. 9–13. As shown in Fig. 9, three bands 13 of glass-fibre fabric is unwound from delivery spools and led each through one slot in one end wall of a container 14 for liquid plastic. From said wall the bands are led down into the plastic and pass through a screen 15 having a straight slot 16 (Fig. 11) for each band and through a second screen 17 having slots 18 of the shape shown in Fig. 12. Finally, the bands are moved up to the mouth of a moulding tube 19 connected to the other end wall of said container 14 and having the cross-sectional configuration shown in Fig. 13, and together with the adhering plastic they are drawn into said tube, the three part sections imparted to the bands by the slots 18 being brought together into the closed section according to Fig. 12. It is possible also to provide a reinforcement of longitudinal extending glass-fibre filaments as in Fig. 1, said glass-fibre filaments in the plastic adhering thereto filling out the space of the T-section inside said bands 13, or the space within the section may be filled out exclusively with plastic and a cheap filler, such as chalk. It is thus possible to balance price and strength as desired. The hardening of the plastic is carried out in the manner already described.

With the use of the bands 13 of glass-fibre fabric in which up to two thirds of the glass fibres extend in the transverse direction, the products obtain a considerably greater strength in the transverse direction.

What I claim and desire to secure by Letters Patent is:

1. A method for manufacturing rods and sections of glass fiber-reinforced plastic comprising continuously moving glass fibers in the form of an elongated assembly from a supply through a bath of a liquid low pressure-low temperature thermosetting plastic for impregnating the assembly of glass fibers with liquid plastic, drawing the impregnated glass fibers with the plastic adhering thereto directly from said bath into a molding tube of the desired cross-section configuration to completely fill the molding tube, moving the glass fiber and plastic material forward within said molding tube, applying heat externally of the initial part of the tube for heating the glass fiber and plastic material during the travel thereof through the said initial part of the molding tube up to a point where the plastic is about to gel, applying a cooling medium to the external portion of the remaining length of the tube for cooling the exterior of the glass fiber and plastic material during the travel thereof through the remaining length of the tube for preventing the outer layer of the plastic from gelling adjacent the inner wall of the tube while the interior of the tube continues to gel and passes into a cured state, drawing the glass fiber and plastic material as a continuous strand out of the tube, heating the strand as it emerges from the tube for curing said outer layer and to finish the curing of the plastic throughout the entire cross section of the strand, and finally cutting said strand into desired lengths.

2. A method for manufacturing rods and sections of glass fiber-reinforced plastic comprising continuously moving glass fibers in the form of filaments from a supply through a bath of a liquid low pressure-low temperature thermosetting plastic for impregnating the assembly of glass fibers with liquid plastic, drawing the impregnated filaments with the plastic adhering thereto directly from said bath into a molding tube of the desired cross-sectional configuration to completely fill the molding tube, moving the filaments and plastic material forward within said molding tube, applying heat externally of the initial part of the tube for heating the filaments and plastic material during the travel thereof through the said initial part of the molding tube up to a point where the plastic is about to gel, applying a cooling medium to the external portion of the remaining length of the tube for cooling the exterior of the filaments and plastic material during the travel thereof through the remaining length of the tube for preventing the outer layer of the plastic from gelling adjacent the inner wall of the tube while the interior of the tube continues to gel and passes into a cured state, drawing the filaments and plastic material as a continuous strand out of the tube, heating the strand as it emerges from the tube for curing said outer layer and to finish the curing of the plastic throughout the entire cross section of the strand, and finally cutting said strand into desired lengths.

3. A method for manufacturing rods and sections of glass fiber-reinforced plastic comprising continuously moving glass fibers in the form of a web from a supply through a bath of a liquid low pressure-low temperature thermosetting plastic for impregnating the web with liquid plastic, drawing the impregnated web with the plastic adhering thereto directly from said bath into a molding tube of the desired cross-sectional configuration to completely fill the molding tube, moving the web and plastic material forward within said molding tube, applying heat externally of the initial part of the tube for heating the web and plastic material during the travel thereof through the said initial part of the molding tube up to a point where the plastic is about to gel, applying a cooling medium to the external portion of the remaining length of the tube for cooling the exterior of the web and plastic material during the travel thereof through the remaining length of the tube for preventing the outer layer of the plastic from gelling adjacent the inner wall of the tube while the interior of the tube continues to gel and passes into a cured state, drawing the web and plastic material as a continuous strand out of the tube, heating the strand as it emerges from the tube for curing said outer layer and to finish the curing of the plastic throughout the entire cross section of the strand, and finally cutting said strand into desired lengths.

4. A method for manufacturing rods and sections of glass fiber-reinforced plastic comprising continuously moving glass fibers in the form of woven bands from a supply through a bath of a liquid low pressure-low temperature thermosetting plastic for impregnating the woven bands with liquid plastic, drawing the impregnated woven bands with the plastic adhering thereto directly from said bath into a molding tube of the desired cross-sectional configuration to completely fill the molding tube, moving the woven bands and plastic material forward within said molding tube, applying heat externally of the initial part of the tube for heating the woven bands and plastic material during the travel thereof through the said initial part of the molding tube up to a point where the plastic is about to gel, applying a cooling medium to the external portion of the remaining length of the tube for cooling the exterior of the woven bands and plastic material during the travel thereof through the remaining length of the tube for preventing the outer layer of the plastic from gelling adjacent the inner wall of the tube while the interior of the tube continues to gel and passes into a cured state, drawing the woven bands and plastic material as a continuous strand out of the tube, heating the strand as it emerges from the tube for curing said outer layer and to finish the curing of the plastic throughout the entire cross section of the strand, and finally cutting said strand into desired lengths.

5. A method for manufacturing rods and sections of glass fiber-reinforced plastic comprising continuously moving glass fibers in the form of interwoven bands from a supply through a bath of a liquid low pressure-low temperture thermosetting plastic for impregnating the interwoven bands with liquid plastic, drawing the impregnated interwoven bands with the plastic adhering thereto directly from said bath into a molding tube of the desired cross-sectional configuration to completely fill the molding tube, moving the interwoven bands and plastic material forward within said molding tube, applying heat externally of the initial part of the tube for heating the interwoven bands and plastic material during the travel thereof through the said initial part of the molding tube up to a point where the plastic is about to gel, applying a cooling medium to the external portion of the remaining length of the tube for cooling the exterior of the interwoven bands and plastic material during the travel thereof through the remaining length of the tube for preventing the outer layer of the plastic from gelling adjacent the inner wall of the tube while the interior of the tube continues to gel and passes into a cured state, drawing the interwoven bands and plastic material as a continuous strand out of the tube, heating the strand as it emerges from the tube for curing said outer layer and to finish the curing of the plastic throughout the entire cross section of the strand, and finally cutting said strand into desired lengths.

6. A method for manufacturing rods and sections of glass fiber-reinforced plastic comprising continuously impregnating a plurality of glass fibers with a liquid low pressure-low temperature thermosetting plastic, drawing the impregnated glass fibers with the plastic adhering thereto into an elongated confined space of the desired cross-sectional configuration, applying heat externally of the tube to heat the glass fibers and plastic material during an initial part of the travel thereof in the confined space up to a point where the plastic is about to gel, cooling the outer layer of the glass fibers and plastic during the remaining part of the travel thereof through the confined space in order to restrain the plastic from gelling in the outer layer while the interior continues to gel and passes into a cured state, drawing the glass fibers and plastic as a continuous stand out of the confined space, heating the strand as it emerges from the confined space to cure said outer layer and to finish the curing of the plastic throughout the entire cross-section of the strand, and finally cutting said strand into desired lengths.

References Cited in the file of this patent

UNITED STATES PATENTS

| | | |
|---|---|---|
| 2,496,911 | Green | Feb. 7, 1950 |
| 2,617,752 | Von Hauteville | Nov. 11, 1952 |
| 2,721,599 | Van De Vanter | Oct. 25, 1955 |
| 2,741,294 | Pancherz | Apr. 10, 1956 |
| 2,766,160 | Bentov | Oct. 9, 1956 |